United States Patent Office 3,250,395
Patented May 10, 1966

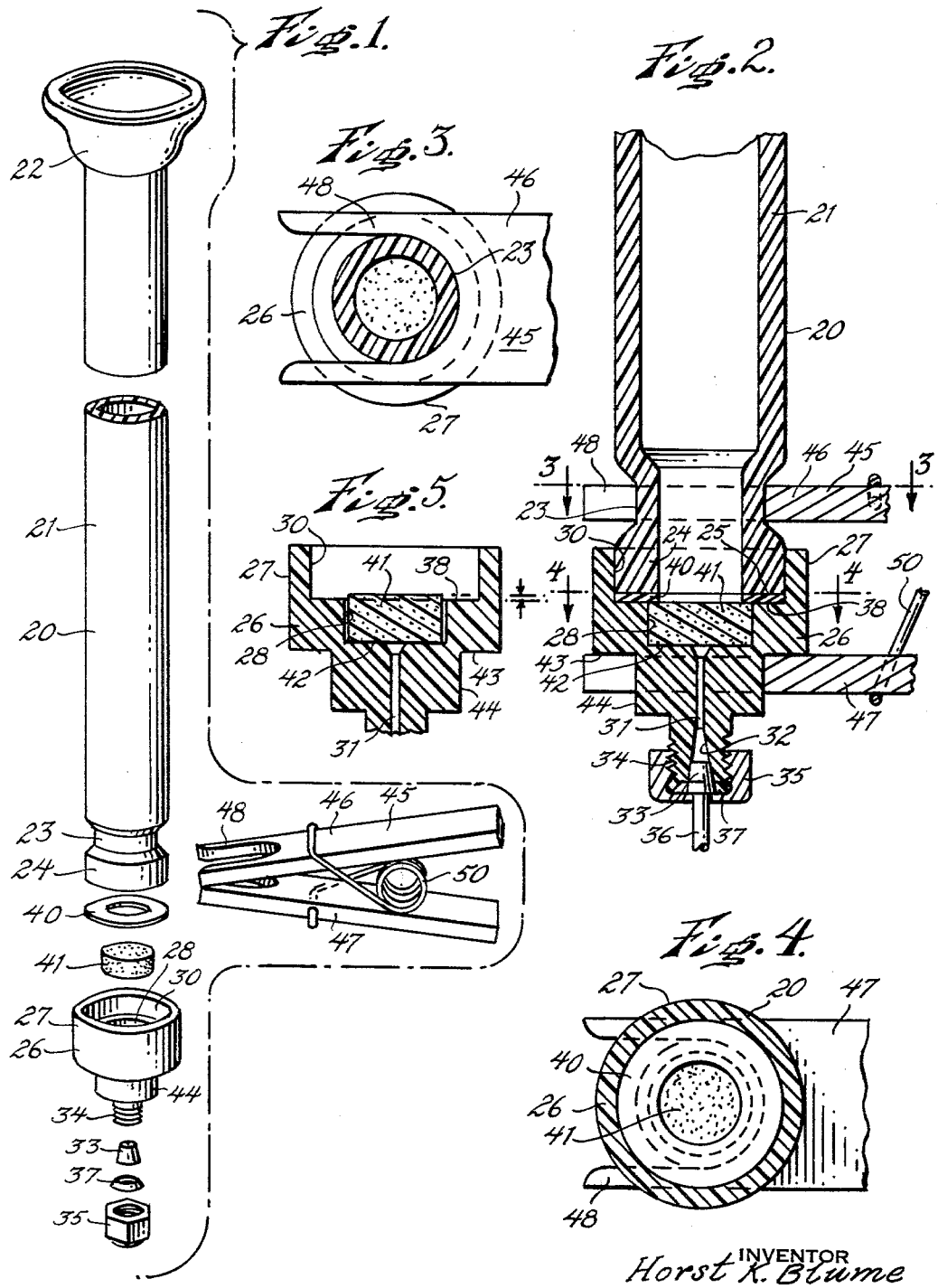

3,250,395
CHROMATOGRAPHIC COLUMNS
Horst K. Blume, Philadelphia, Pa., assignor to Phoenix Precision Instrument Co., Philadelphia, Pa., a corporation of Pennsylvania
Filed Mar. 4, 1963, Ser. No. 262,720
1 Claim. (Cl. 210—263)

The present invention relates to fluid apparatus, especially chromatographic columns and the like and particularly to end construction for such columns.

A purpose of the invention is to make a chromatographic column remain tight under relatively high pressures, while permitting easy access to the interior and providing for removal and replacement of a filter or porous disc or membrane and easy removal of resin or other column packing material through the bottom of the column.

A further purpose is to secure more effective sealing by a gasket which can readily be removed and replaced but which will when in place have the combined purpose of preventing leakage of fluid or resin from the column and to the outside also preventing leakage of resin or packing material around a filter or porous disc into the take-off line.

A further purpose is to make a more compact end construction on a chromatographic column.

A further purpose is to permit ready interchange of present columns without changing the water jacket.

A further purpose is to utilize inert materials such as glass or inert plastic so that the material to be analyzed will not get in touch with metals or other corrosive materials.

A further purpose is to reduce the cost of end construction on columns.

A further purpose is to prevent difficulty with binding and breakage of chromatographic columns.

Further purposes appear in the specification and in the claims.

In the drawings I have chosen to illustrate a few only of the embodiments in which the invention may appear, selecting the forms shown from the standpoints of convenience in illustration, satisfactory operation and clear demonstration of the principles involved.

FIGURE 1 is an exploded perspective of a chromatographic column to which the invention is applied.

FIGURE 2 is an enlarged longitudinal axial section of the column of FIGURE 1 duly assembled.

FIGURE 3 is a fragmentary section on the line 3—3 of FIGURE 2.

FIGURE 4 is a fragmentary section on the line 4—4 of FIGURE 2.

FIGURE 5 is a fragmentary axial section showing a portion of FIGURE 2 prior to assembly.

Describing in illustration but not in limitation and referring to the drawings:

Extensive use is made at the present time of the chromatograph, both gas and liquid. While the present invention is intended primarily for liquid chromatography, it is also applicable where desired to other types of chromatographic applications, including gas.

The invention is believed to have its widest application in liquid chromatography of proteins, amino acids, peptides, nucleotides, nucleotide derivatives, fatty acids, and other chromatographic applications of analytical or preparative nature. For references attention is invited to the following which describe devices of this general character:

S. Moore, and W. H. Stein: J. Biol. Chem., 192, 663 (1951).

S. Moore, and W. H. Stein: J. Biol. Chem., 211, 893 (1954).

S. Moore, and W. H. Stein: J. Biol. Chem., 211, 907 (1954).

D. Spackman, W. H. Stein, and S. Moore: Federation proceedings, 15, 358 (1956).

D. Spackman, W. H. Stein, and S. Moore: Anal. Chem., 30, 1190 (1958).

K. A. Piez and L. Morris: "A Modified Procedure for the Automatic Analysis of Amino Acids," Anal. Biochem., 1:187 (1960).

E. A. Peterson and H. A. Sober: "A Variable Gradient Device for Chromatography," Anal. Chem. 31:857 (1959).

E. A. Peterson and J. Rowland: "A Simplified Multichamber Gradient Mixer," J. Chromatog, 5:330 (1961).

N. G. Anderson: Anal. Biochem. 4:269 (1962).

It will be evident that in a liquid chromatograph of the character specifically referred to, a suitable packing or absorber such as anion or cation exchange resin is placed in the column, and a medium which in the preferred embodiment of the invention may be a buffer with a standard or a sample is passed through one or more columns. In the case of liquid chromatography a coloring agent may be included and the color observed at a particular point in the system or the electrical conductivity can be measured.

In the case of gas chromatography a voltage pulse is recorded to measure the ionization.

It will be evident that in liquid chromatography either an aqueous or an organic liquid can be used as a medium and in gas chromatography the medium is normally an inert gas such as helium or argon.

It is necessary from time to time to gain access to the ends of the column or columns as for example to change the column entirely, to replace the packing or absorbing material or to replace the filter or porous disc.

Existing column end constructions have been difficult to make and expensive. Where a threaded end has been used, this has caused problems by binding of the thread, and by breaking of the material of the column when the thread binds. It has also been difficult in some cases to produce the threads.

Existing chromatographic devices are described generally in Phoenix Precision Instrument Company Bulletin VG-6000A and Bulletin K-8000A.

The present invention is concerned with making a column end construction which is less troublesome, easier to operate, less expensive and which will be effective under high pressures which frequently are encountered, since modern columns must withstand high operating pressures.

While the invention is primarily intended for the bottom end of the column, it can be applied to the top and or to both ends, or to any section along the column.

In the drawings I illustrate a chromatographic column 20 which is empty but in use will normally be filled with a packing or absorber such as ion exchange resin, or other suitable column packing material. The column may be made of a wide variety of materials, such as plastic, metals ceramic or the like, but will preferably be of glass.

In the column as shown, there is a uniform round bore portion 21 which receives the packing material and a top construction which in this case has a flare 22 old in the art, but as explained may be similar to tne bottom construction if desired. The detail of the top construction here shown is old in the art.

Near the bottom of the column I provide an external annular recess 23, by reducing the diameter of the interior, and then between the bottom end and the recess I provide a butt end portion 24 which suitably has the same diameter as the outside of the portion 21 but has the same interior diameter as the recess portion so that it is preferably somewhat thickened. The end portion has a butt end wall 25 which extends straight across.

An end cup 26 is used which has preferably an exterior circular contour at 27 and has a bore 28 which is of a diameter greater than the inside of the end of the column at the butt end but smaller than the outside diameter of the end of the column. Concentric with the bore 28 I provide a counterbore 30 which is large enough to surround and fit reasonably closely around the outside of the butt end.

The cup also has suitably from the center beyond the bore 28 a connector and a connector opening or passage 31 which connects to a fitting including a conical opening 32 which receives a cone 33, an externally threaded ferrule 34, a cap 35 and a tube 36 which is conveniently slightly flared to anchor in the cap 35. A gasket 37 completes the sealing of the fitting by clamping between the end of the ferrule and the inside of the cap around the cone.

It is intended that the fitting be a suitable conventional fitting to any suitable tube.

The cap itself can be of metal if desired, but preferably the cap, the fitting and the connecting tubing and other components are made of metals or inert materials such as polytetrafluoroethylene (Teflon) or polyethylene.

The cap has a shoulder at 38 between the bore and the counterbore which receives a suitably flat ring gasket 40 preferably of rubber or other suitable material, preferably somewhat softer than the cooperating parts.

The counterbore 28 receives a filter membrane or porous disc 41 which engages on a bottom portion 42 and is preferably sufficiently resilient so that it has a greater thickness than the cavity formed in the cup when it is relaxed as shown in FIGURE 5, but is compressed to fully occupy the cavity when it is pressed down in the assembled form. The porous disc may suitably be of porous tetrafluoroethylene (Teflon) although it can be made of sintered glass, other plastic, ceramic or porous metals such as a powder metal compact.

It will be evident that the gasket 40 performs a dual function of sealing between the cup and the butt end of the column so that leakage from the column cannot occur and also sealing between the cup and the outer edge of the porous disc so that short circuiting of the porous disc by the fluid cannot occur and flow of the fluid must pass through the porous disc. The porous disc retains the packing in the column.

The cup has a shoulder 43 on the side adjoining the ferrule formed by a reduced diameter 44 at that point. This permits a suitable pinch clamp 45 having arms 46 and 47 to engage and exert axial pull. Each arm has a fork at 48 and the forks engage respectively one in the recess 23 and the other around the reduced cup portion 44 against the shoulder 43.

The pinch clamp has a torsion spring 50 which exerts the compression as well known.

In operation it will be understood that the device can readily be disassembled by relaxing the pinch clamp by squeezing on the outer ends of the arms, suitably using a screw clamp if necessary to exert the required pressure. The pinch clamp then slips off sideways and the parts can be pulled apart. The filter, membrane or porous disc can be removed and replaced, if desired, to insert one having larger or smaller pores. The column filling can also readily be replaced and the gasket can also readily be replaced.

To assemble, a porous disc 41 is inserted in its recess, a gasket 40 is placed as best seen in FIGURE 2 so that it not only covers the butt end of the column but also engages the outer edge of the porous disc and the adjoining portion of the shoulder 38, and then the column can be reassembled with the butt end of the column against the gasket, and the pinch clamp can be applied to hold the parts together.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claim.

Having thus described my invention, what I claim as new and desire to secure by Letters Patent is:

In a chromatographic column, a column tube having a butt end and having an external recess near the end, said tube having a wall thickness at the end, an end cup cooperating with the tube, having a cup counterbore which receives the butt end, an internal first shoulder parallel to the butt end but extending radially inwardly less than the thickness at the butt end, a bore extending from the counterbore and forming a recess which terminates in a second internal shoulder, a connector and connector opening at the side remote from the counterbore, the connector opening communicating with the bore and having an external shoulder on the side of the cup remote from the counterbore, a filter disc in the recess of the bore resting on the second internal shoulder, a ring gasket in the counterbore engaging at one side the butt end of the tube and engaging at the other side both the first internal shoulder and the filter disc, and preventing leaking between the tube and the cup and also preventing flow around the filter disc without going through the filter disc, and clamping means securing the end cup to the column tube.

No references cited.

REUBEN FRIEDMAN, *Primary Examiner.*

S. ZAHARNA, *Assistant Examiner.*